US011689151B2

(12) United States Patent
Kufner et al.

(10) Patent No.: US 11,689,151 B2
(45) Date of Patent: Jun. 27, 2023

(54) SOLAR PLANT HAVING PIVOTABLE AND LOCKABLE MODULE TABLE

(71) Applicant: Ideematec Deutschland GmbH, Wallerfing (DE)

(72) Inventors: Johann Kufner, Aholming (DE); Nathalie Kermelk, Aidenbach (DE); Peter Birr, Rattenberg (DE); Benjamin Bauer, Oberpöring (DE); Ronny Rehm, Osterhofen (DE)

(73) Assignee: Ideematec Deutschland GmbH, Wallerfing (DE)

( * ) Notice: Subject to any disclaimer, the term of this patent is extended or adjusted under 35 U.S.C. 154(b) by 67 days.

(21) Appl. No.: 17/057,729

(22) PCT Filed: Apr. 11, 2019

(86) PCT No.: PCT/EP2019/059300
§ 371 (c)(1),
(2) Date: Nov. 23, 2020

(87) PCT Pub. No.: WO2019/228703
PCT Pub. Date: Dec. 5, 2019

(65) Prior Publication Data
US 2021/0211089 A1 Jul. 8, 2021

(30) Foreign Application Priority Data
May 30, 2018 (DE) .................... 20 2018 103 053.1

(51) Int. Cl.
*H02S 20/32* (2014.01)
*H02S 20/10* (2014.01)
(Continued)

(52) U.S. Cl.
CPC ............. *H02S 20/32* (2014.12); *F16H 27/06* (2013.01); *F16H 35/00* (2013.01); *F24S 30/425* (2018.05);
(Continued)

(58) Field of Classification Search
CPC .......... H02S 30/32; H02S 30/10; H02S 20/32; F24S 30/425; F24S 2030/134;
(Continued)

(56) References Cited

U.S. PATENT DOCUMENTS 2,618,187 A 11/1952 Shaff
10,326,401 B2 * 6/2019 Wu ....................... F24S 30/455
(Continued)

FOREIGN PATENT DOCUMENTS

CN 206135796 U 4/2017
DE 328666 C 11/1920
(Continued)

OTHER PUBLICATIONS

European Patent Office Action dated Mar. 3, 2023.

*Primary Examiner* — Bethany L Martin
(74) *Attorney, Agent, or Firm* — Dickinson Wright PLLC; Andrew D. Dorisio

(57) ABSTRACT

The invention relates to a solar plant (1) having at least one pivotable module table (2a, 2b, 2c) which supports at least one photovoltaic solar module (3), preferably multiple photovoltaic solar modules (3), and is coupled in such a manner to at least one gear element (4) pivotable about an axis (A) that pivoting the gear element (4) causes the module table (2a to 2c) to be pivoted so that the solar modules (3) track the motion of the sun, the gear element (4) being driven and thus pivoted by an electrically driven drive shaft (5), at least one actuation element (8) being integrated in the drive shaft (5), the gear element (4) being both driven and blocked by (Continued)

the actuation element (8), the actuation element (8) engaging into the toothing (11) of the gear element (4) for driving or blocking the gear element (4).

5 Claims, 8 Drawing Sheets

(51) Int. Cl.
*F24S 30/425* (2018.01)
*F16H 27/06* (2006.01)
*F16H 35/00* (2006.01)
*F24S 30/00* (2018.01)

(52) U.S. Cl.
CPC ........ *H02S 20/10* (2014.12); *F16H 2035/005* (2013.01); *F24S 2030/134* (2018.05)

(58) Field of Classification Search
CPC .... F24S 30/40; F24S 2030/15; F24S 2030/16; F16H 27/06; F16H 35/00; F16H 2035/005
See application file for complete search history.

(56) References Cited

U.S. PATENT DOCUMENTS

| | | | |
|---|---|---|---|
| 2008/0066985 A1 | 3/2008 | Cheng | |
| 2008/0308091 A1* | 12/2008 | Corio | F24S 30/425 126/606 |
| 2014/0174499 A1 | 6/2014 | Fitzgerald et al. | |
| 2014/0283894 A1 | 9/2014 | Silver | |
| 2014/0338659 A1* | 11/2014 | Corio | F24S 30/452 126/714 |
| 2015/0107580 A1* | 4/2015 | Weber | F24S 40/80 384/444 |
| 2017/0102168 A1* | 4/2017 | Childress | F16C 11/06 |
| 2017/0149375 A1 | 5/2017 | Bailey et al. | |
| 2017/0237391 A1* | 8/2017 | Michotte De Welle | F24S 25/12 248/372.1 |
| 2018/0091088 A1 | 3/2018 | Barton et al. | |
| 2019/0190442 A1* | 6/2019 | Tordo | H02S 20/32 |

FOREIGN PATENT DOCUMENTS

| | | |
|---|---|---|
| DE | 202015009590 U1 | 6/2018 |
| WO | 1979000930 A1 | 11/1979 |
| WO | 2019179781 A1 | 9/2019 |

\* cited by examiner

SOLAR PLANT HAVING PIVOTABLE AND LOCKABLE MODULE TABLE

FIELD OF THE INVENTION

The invention at hand relates to a solar plant having at least one module table which supports at least one photovoltaic solar module, preferably multiple photovoltaic solar modules, and is pivotable about at least one axis.

BACKGROUND OF THE INVENTION

Such solar plants are known from the state of the art as so-called horizontal trackers, for example. Owing to the fact that the module tables of such solar plants are pivotable, they can track the motion of the sun so that an optimal incident sun radiation is ensured during the course of the day.

Most of the so-called horizontal trackers are set up on a tube supported centrally by a gear. By rotating the tube about its longitudinal axis, the module tables and consequently the solar modules are pivoted. The total length of a table is generally up to 80 meters. When a module table is this long, the total length of a side wing, which extends from the rotating tube to the free end of the table, is about 40 meters.

A major problem with solar plants known from the state of the art consists in uncontrolled pivoting of the module tables when wind loads occur. Tests with wind tunnels conducted by the applicant have yielded that the load doubles when the inclination of the originally horizontal module table is altered by 5 degrees. This often leads to a dangerous build-up of oscillations under wind loads, the so-called galloping effect.

In order to get this problem under control, tracker systems have been developed which attempt to compensate the oscillations, which arise because of winds, using hydraulic dampers or similar auxiliary constructions. This, however, has proven to be suitable to only a limited extent as a measure for resolving the disadvantages described above. Moreover, such constructions are difficult to install and thus more costly.

SUMMARY OF THE INVENTION

The object of the invention at hand is to provide a solar plant as described in the introduction which overcomes the disadvantages described above known from the state of the art. The object of the invention is in particular to provide a solar plant whose module tables are prevented from exhibiting a build-up of oscillations due to winds as much as possible.

This object is attained according to the invention by a solar plant as mentioned in the introduction whose module table is coupled in such a manner to at least one gear element pivotable about an axis that pivoting the gear element causes the module table to be pivoted so that the solar modules track the motion of the sun, the gear element being driven and thus pivoted by an electrically driven drive shaft, at least one actuation element being integrated in the drive shaft, the gear element being able to both be driven and blocked by the actuation element, the actuation element engaging into the toothing of the gear element for driving or blocking the gear element.

By means of the actuation element integrated in the drive shaft, it is therefore possible to both pivot and lock the module table and thus to keep it from pivoting under wind loads. Rotating the drive shaft about its longitudinal axis leads to the gear element being pivoted (actuated) by the actuating element engaging into the toothing of the gear element and driving (pivoting) it. If the module table is to be prevented from further pivoting (for example when winds arise), the rotational movement of the drive shaft is stopped so it stands still. In order to now block the module table, the actuation element remains in the toothing of the gear element when the drive shaft is locked and consequently prevents a further pivoting of the gear element and thus a pivoting of the entire module table (for example when wind loads arise).

Advantageously, the gear element is a gear segment. Such a gear segment has an arc which carries the toothing of the gear segment. The side of the gear segment opposite the arc is generally connected to the module table to be pivoted either directly or via a connecting element. The connecting element can be a cross brace of a module table or of a module frame, for example.

In a particularly preferred embodiment of the solar plant according to the invention, the actuation element comprises at least two actuation pins which are disposed essentially parallel to each other and engage into the toothing of the gear element for driving (pivoting) or blocking the gear element, preferably both actuation pins each resting in a different tooth space, in particular in adjacent tooth spaces, of the gear element and remaining there for blocking the gear element. Such an embodiment of the actuation element is particularly easy to produce and at the same time ideally suited for both driving and blocking the gear element. If both actuation pins are each motionless in a corresponding tooth space of the gear element, pivoting the gear element further is no longer possible. This then also prevents a build-up of oscillations of the module under wind loads.

The actuation element can be an angular or round ring or frame, for example. Such an embodiment of the actuation element is particularly easy to produce and effective in its use.

Advantageously, the at least one module table is mounted on the at least one gear element. This can be performed either directly or indirectly via a connecting element.

Preferably, the longitudinal axis of the drive shaft, around which it rotates, extends through the toothing of the at least one gear element. In such an embodiment, the gear element can be blocked simply by the drive shaft standing still because the actuating element engages into the toothing of the gear element.

Advantageously, the solar plant according to the invention comprises vertical posts for elevated mounting of the at least one module table, the vertical posts at least partially comprising supporting plates for supporting the drive shaft. Such supporting plates divert occurring loads from the drive shaft directly into the vertical posts and consequently into the foundation.

BRIEF DESCRIPTION OF THE DRAWING FIGURES

Further features of the invention are derived from the following description of preferred exemplary embodiments of the invention in conjunction with the drawings and the dependent claims. The individual features can be realized on their own or in combination with each other.

DETAILED DESCRIPTION OF THE INVENTION

Figure 1:
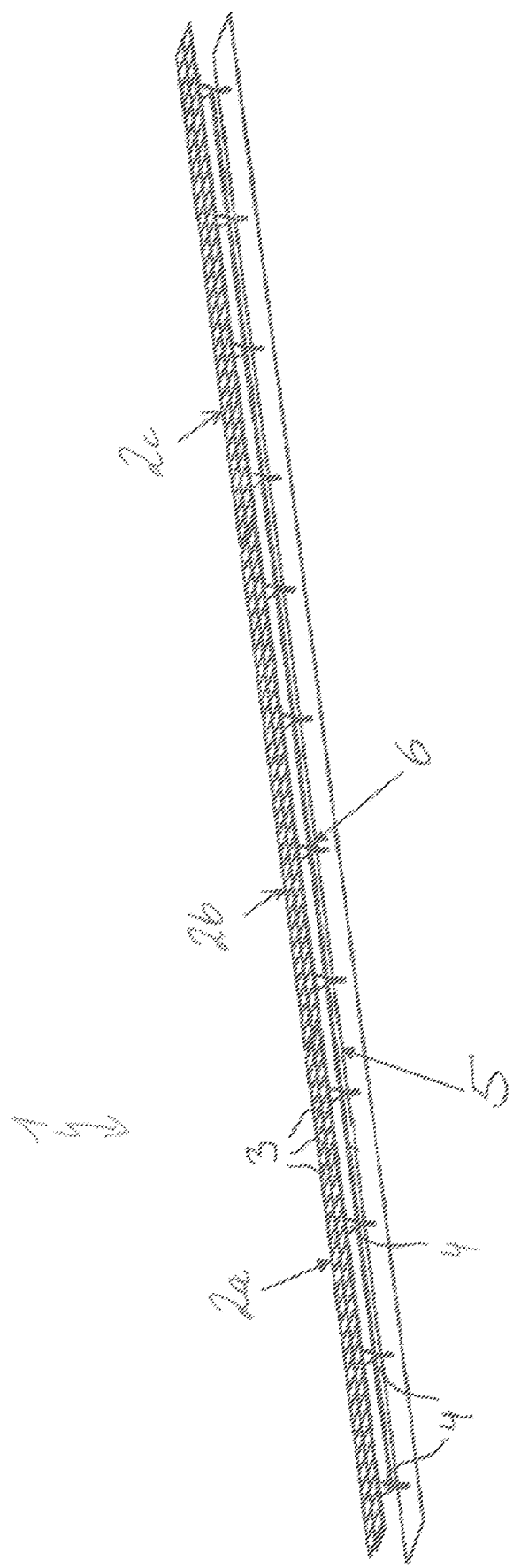
FIG. 1 is a schematic view of a solar plant according to the invention.

FIG. 1 shows a solar plant 1 having three module tables 2a, 2b, 2c. The three module tables 2a to 2c each support multiple photovoltaic solar modules 3. The three module tables 2a to 2c are each coupled to four gear elements in the form of gear segments 4. This coupling between module tables 2a to 2c and gear segments 4 causes a pivoting of gear segments 4 to cause a pivoting of module tables 2a to 2c so individual solar modules 3 can track the motion of the sun. Gear segments 4 are driven and thus pivoted by an electrically driven drive shaft 5. Drive shaft 5 is driven by a transmission unit 6 and drives all three module tables 2a to 2c.

Figure 2:
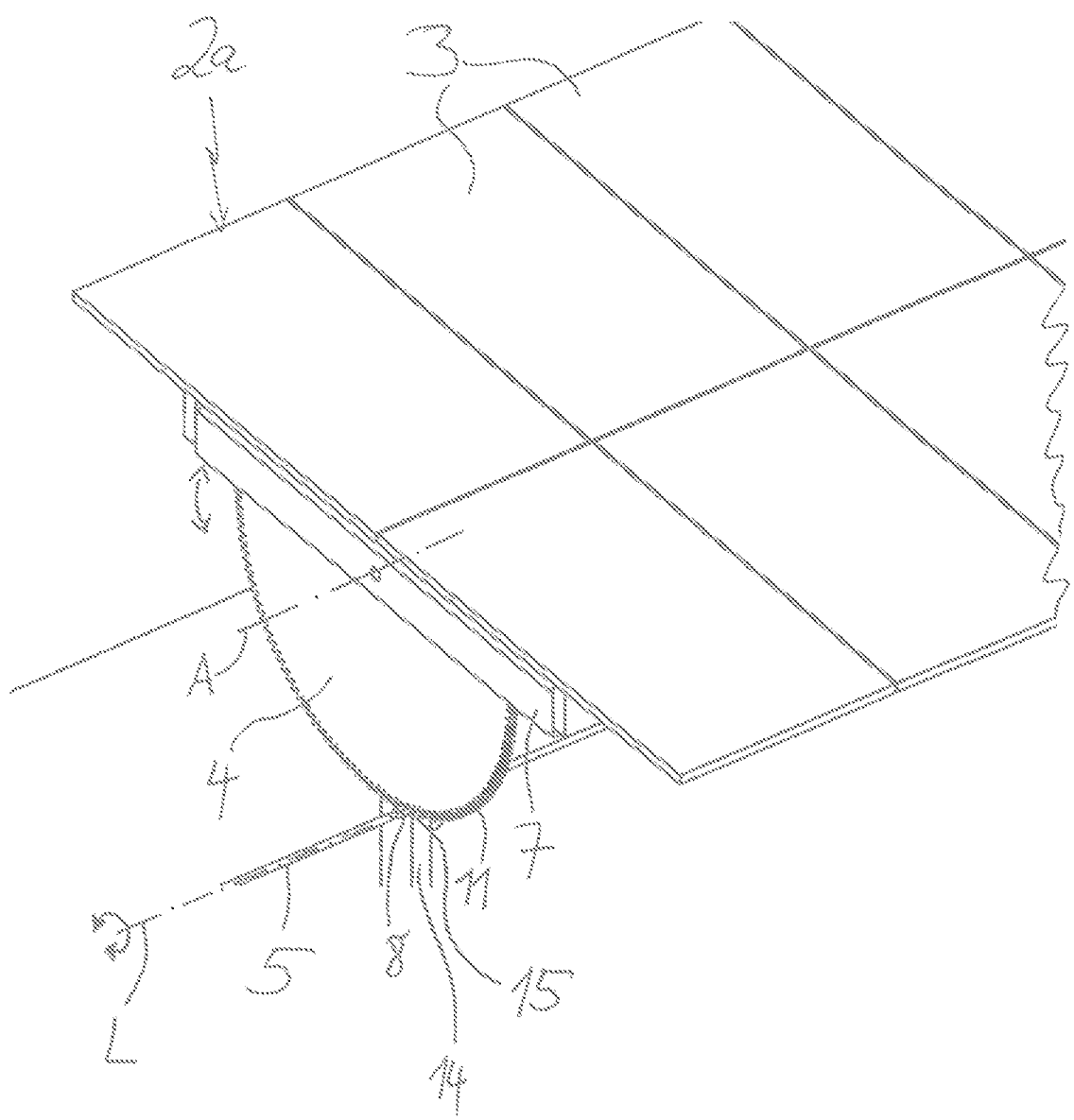
FIG. 2 is a perspective view of a detail of the solar plant from FIG. 1 in the area of a gear element.
Figure 3:
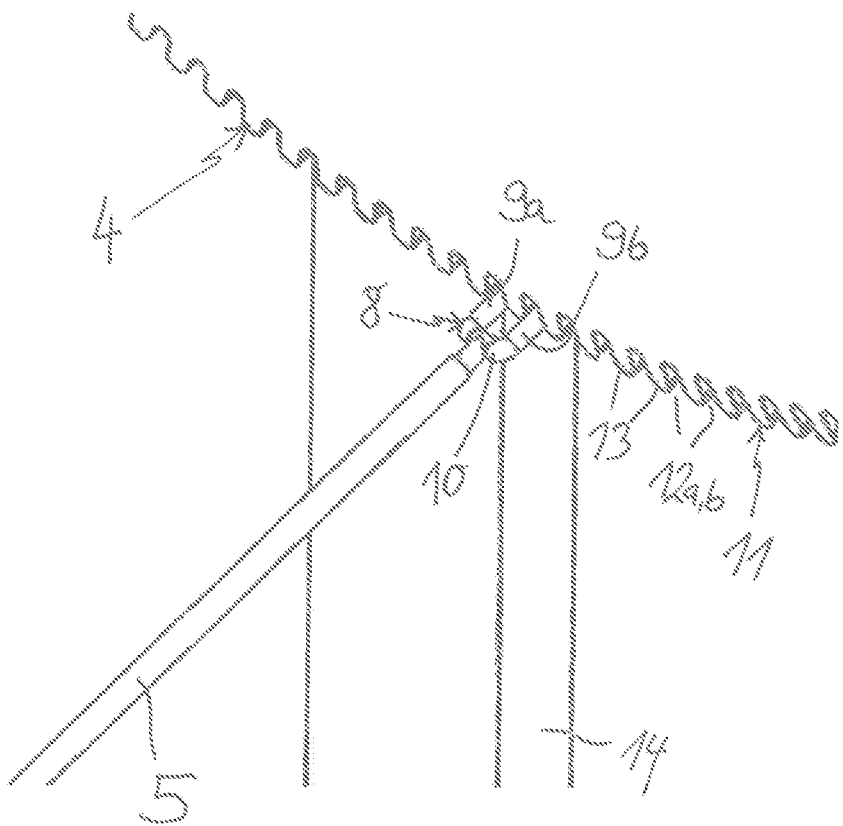
FIG. 3 shows an enlarged detail from FIG. 2 in the area of the actuation element of the drive shaft.

FIGS. 2 and 3 show a detail from solar plant 1 in the area of a gear segment 4. In order to more clearly depict the decisive elements, the solar modules abutting illustrated solar modules 3 have been omitted. As FIG. 2 clearly shows, gear segment 4 is fastened to a cross brace 7 which serves for the cross bracing of illustrated module table 2a. Gear segment 4 is screwed to cross brace 7 in this instance. Gear segment 4 and consequently cross brace 7 are pivotable about transverse axis A of cross brace 7. Pivoting gear segment 4 or cross brace 7 inevitably leads to module table 2a being pivoted as cross brace 7 is an integral component of module table 2a. The possible rotational movements of drive shaft 5 and the pivoting movements of gear segment 4 and consequently module table 2a are indicated by corresponding arrows.

Figure 5:
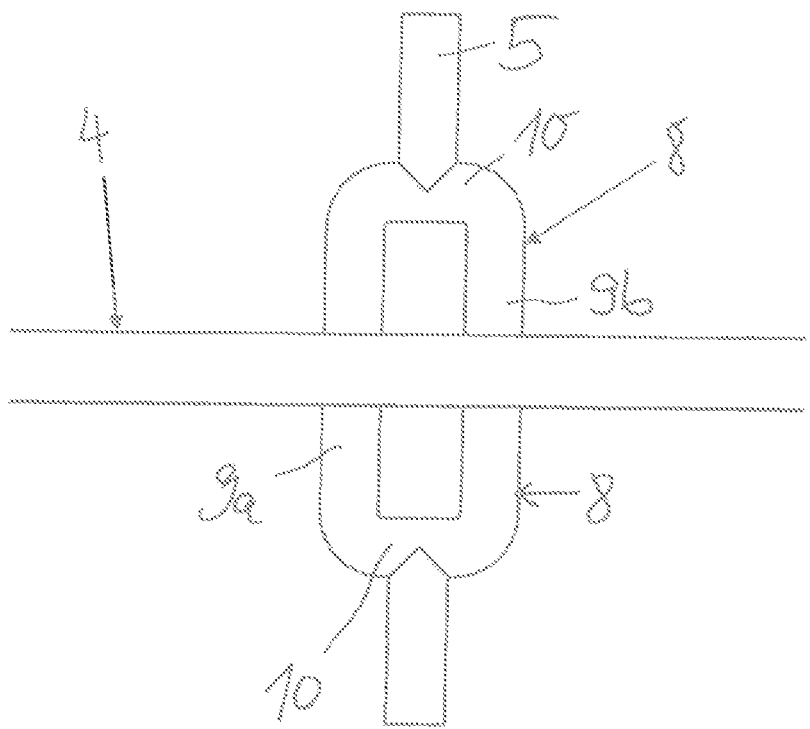
FIG. 5 is a top view of a gear element and an actuation element of the drive shaft of the solar plant from FIG. 1.
Figure 6A:
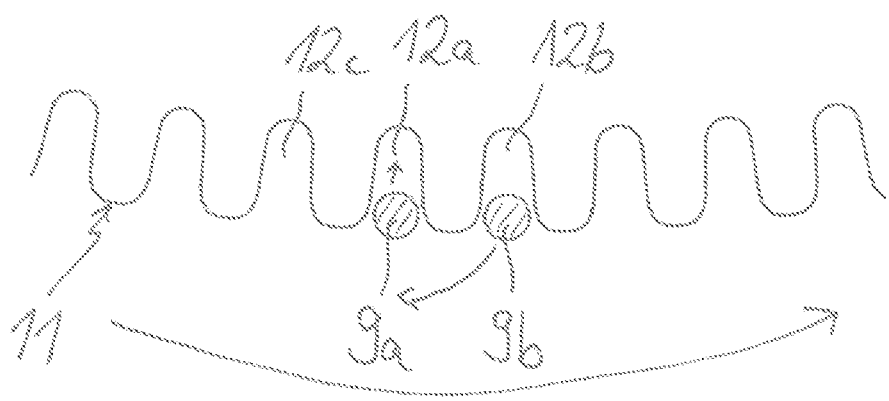
FIGS. 6a-6b show a cross section through an actuation element of the drive shaft of the solar plant from FIG. 1.
Figure 6B:
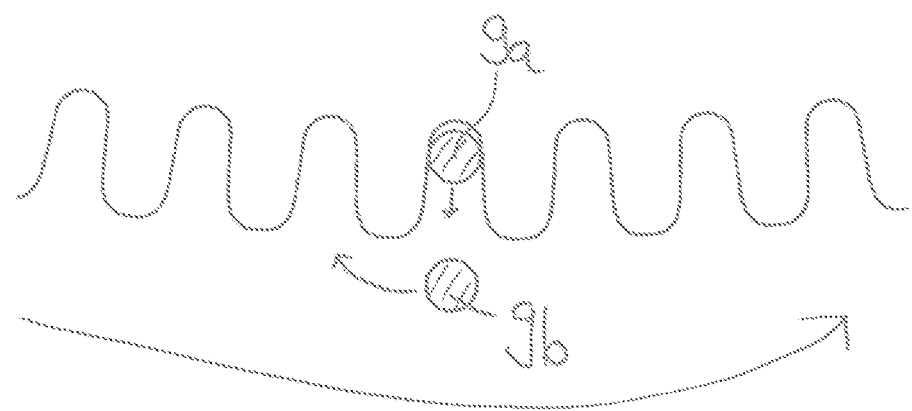

As FIGS. 2 and 3 clearly depict, an actuation element 8 is integrated in drive shaft 5. Actuation element 8 is also illustrated in FIGS. 5, 6a and 6b in an enlarged view. In this exemplary embodiment, actuation element 8 is realized as a type of oblong frame having two actuation pins 9a, 9b disposed parallel to each other. Actuation pins 9a and 9b are connected to each other in one piece via two connecting sections 10. When driving (pivoting) module table 2a, drive shaft 5 rotates about its longitudinal axis L. Actuation pins 9a and 9b are spaced at such a distance to each other that they engage into toothing 11 of gear segment 4 and can cause gear segment 4 to rotate (pivot) owing to the rotational movement of the drive shaft. Depending on whether drive shaft 5 is rotated clockwise or counterclockwise, module table 2a is also pivoted in one or the other direction. The interaction between actuation element 8 and toothing 11 of gear segment 4 is illustrated in further detail in FIGS. 6a and 6b. In FIG. 6a, both actuation pins 9a and 9b each rest in a tooth space 12a, 12b of toothing 11. Tooth spaces 12a and 12b are disposed adjacent to each other. Reference numeral 13 denotes the teeth of toothing 11. In the situations illustrated in FIGS. 6a and 6b, drive shaft 5 rotates clockwise. During this rotational movement, actuation pin 9b leaves tooth space 12b and is then pivoted in such a manner because of the rotational movement of the drive shaft that actuation pin 9b is located directly below tooth space 12a (cf. small arrow). Actuation pin 9a moves deeper into tooth space 12a at the same time. This situation is illustrated in FIG. 6b. Thereafter, actuation pin 9b is pivoted further toward tooth space 12c. Actuation pin 9a is retracted further from tooth space 12a at the same time. Owing to this rotational movement of the drive shaft and thus actuation element 8 in a clockwise direction, gear segment 4 is rotated or pivoted in a counterclockwise direction (cf. large arrow). In the next step, actuation pin 9a is moved in the same fashion as actuation pin 9b before. This is followed by actuation pin 9b being moved in the same fashion and so forth.

If the rotational movement of the drive shaft is now stopped, at least one of the two actuation pins 9a, 9b remains in a tooth space of toothing 11. This blocks gear segment 4 so that the gear segment can no longer be pivoted or rotated. If solar plant 1 is exposed to greater wind loads and there is a risk of a build-up of oscillations of modular tables 2a to 2c, drive shaft 5 is locked in such a manner that at least one actuation pin 9a, 9b of corresponding actuation elements 8 remains in toothing 11 of corresponding gear segments 4. The optimal position of an actuation element 8 when blocking a gear segment 4 is illustrated in FIG. 6a, which is when both actuation pins 9a and 9b are located in a tooth space 12a, 12b. In this position, gear segment 4 and thus entire module table 2a are blocked particularly stably.

In order to be able to immediately achieve such a blocked position when great wind loads arise, the drive shaft can be coupled to a wind sensor, for example. This wind sensor can trigger locking of drive shaft 5 in the position illustrated in FIG. 6a when great wind loads arise.

As seen in FIG. 1, all three module tables 2a to 2c are driven by the same drive shaft 5. The three module tables 2a to 2c are each coupled to four gear segments 4. In order to be able to actuate all twelve gear segments of illustrated solar plant 1, drive shaft 5 also comprises a total of twelve actuation elements 8. This design ensures that all three module tables 2a to 2c can be pivoted or—if required— locked (blocked) simultaneously. In the illustration at hand, three module tables 2a to 2c are moved via a single drive shaft 5. A single drive shaft can even move a plurality of module tables.

Figure 4A:
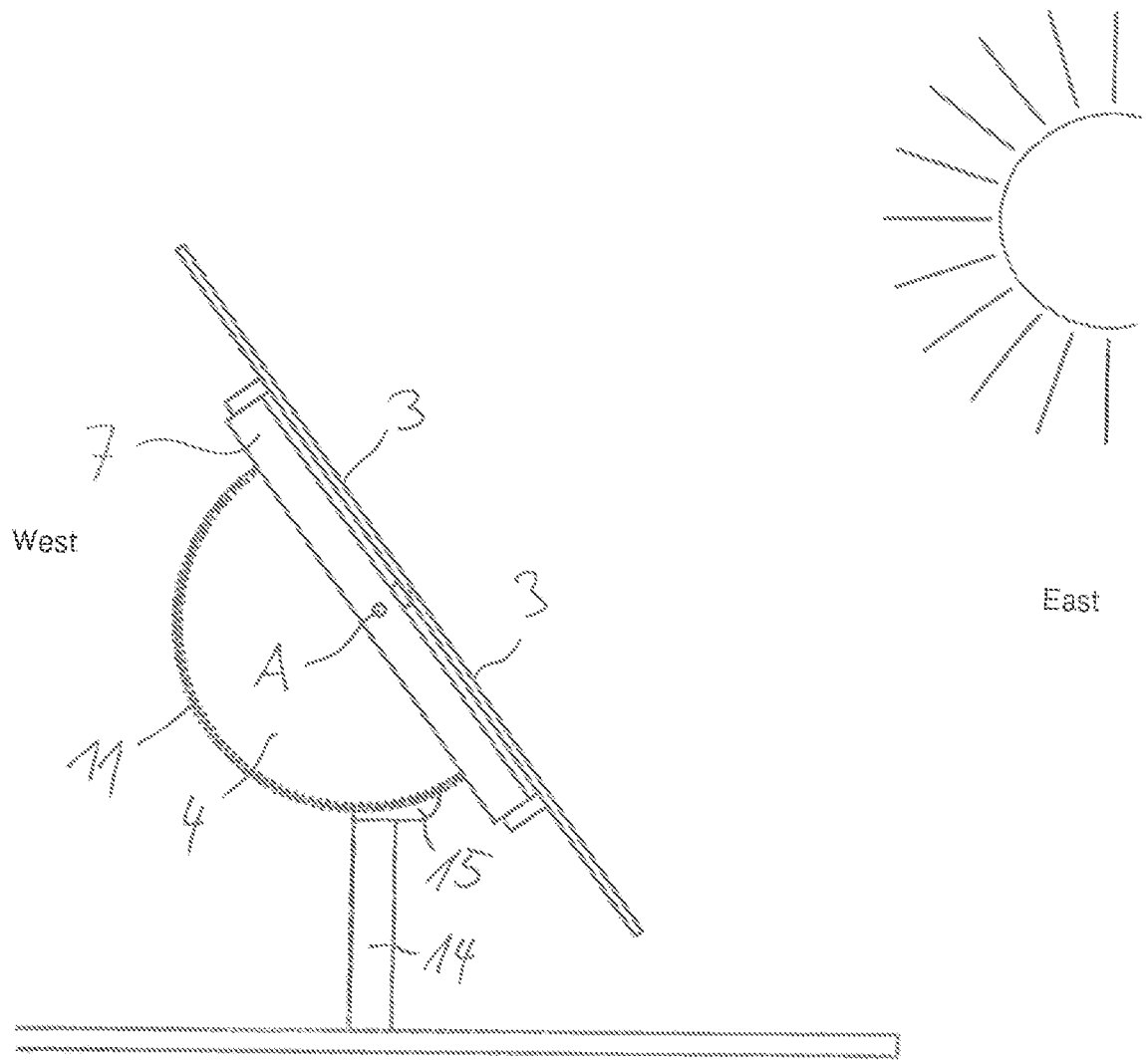
FIGS. 4a-4c are side views of the solar plant from FIG. 1 during the course of the day.
Figure 4B:
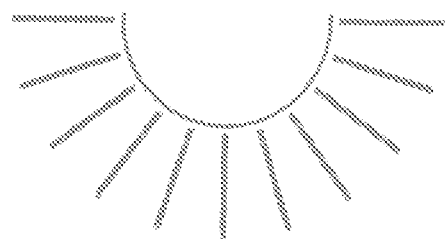
Figure 4B:
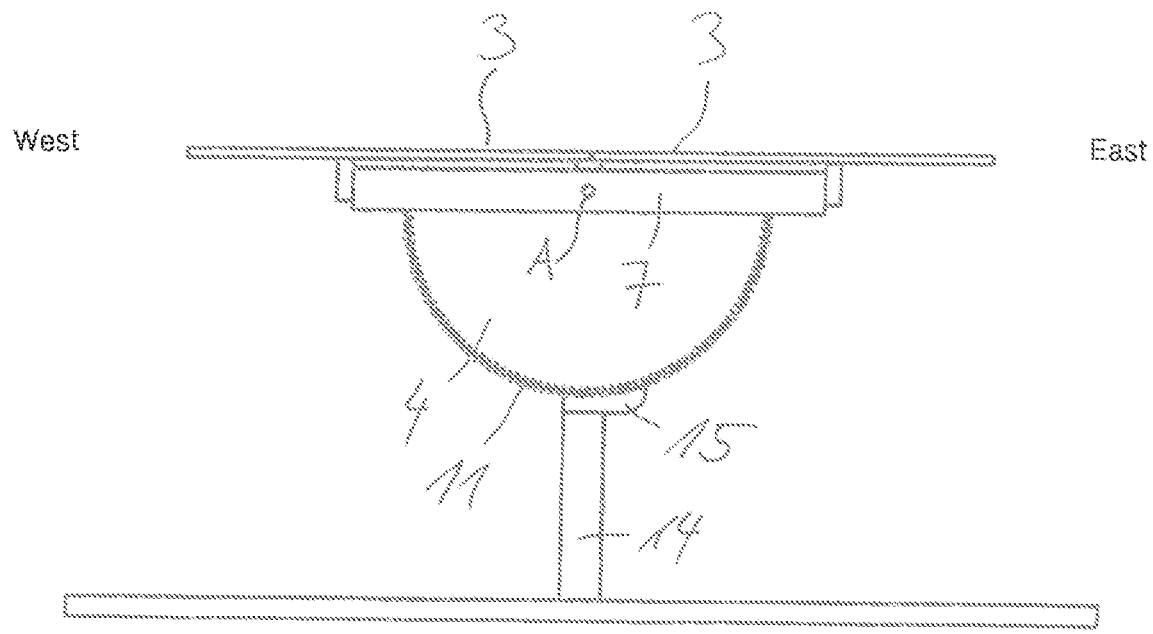
Figure 4C:
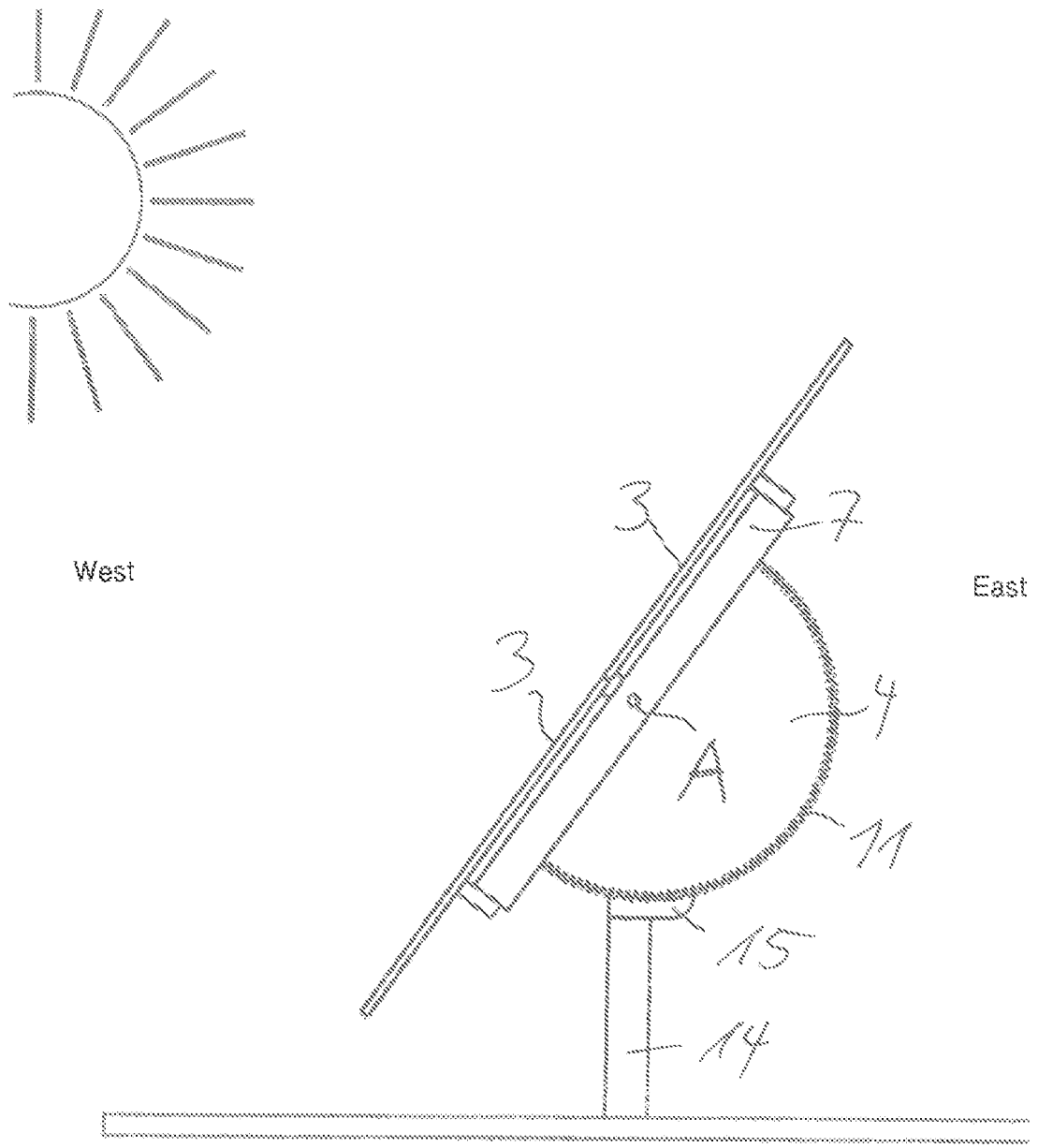

FIGS. 4a to 4c show in which fashion solar plant 1 tracks the sun during the course of the day. FIG. 4a shows the situation in the morning. In order to gradually move solar modules 3 from the morning position to the midday position (cf. FIG. 4b), drive shaft 5 is turned clockwise. This causes a pivoting of the module table from the initial position illustrated in FIG. 4a to a horizontal position (midday position). While drive shaft 5 is rotated clockwise, gear segment 4 pivots or rotates counterclockwise.

A further rotation of drive shaft 5 in a clockwise direction ultimately leads to the module tables and solar modules 3 arriving in the evening position illustrated in FIG. 4c.

If the module tables and solar modules 3 are to be moved back from the evening position to the midday or morning position, drive shaft 5 now has to be moved in a counterclockwise direction. Such a rotation of drive shaft 5 leads to gear segment 4 and thus the module table coupled thereto to be pivoted or rotated in a clockwise direction.

In the shown embodiment, gear segments 4 and drive shaft 5 having actuation elements 8 are made of steel.

As can be seen particularly clearly in FIGS. 6a and 6b, longitudinal axis L of drive shaft 5 extends through toothing 11 of gear segment 4. This has the advantage of the position of longitudinal axis L of drive shaft 5 not having to be changed in order to move the actuation element into the position illustrated in FIG. 6a for achieving an optimal blocking of gear segment 4.

As can be seen in FIG. 1, solar plant 1 comprises vertical posts 14 for elevated mounting of module tables 2a to 2c.

The number of said vertical posts 14 corresponds to the number of gear segments 4 in the case at hand. Vertical posts 14 are all also disposed in the area of gear segments 4.

As in particular FIGS. 2, 3 and 4a to 4c show, supporting plates 15 are disposed on vertical posts 14. These supporting plates 15 serve to support drive shaft 5, which penetrates supporting plates 15. Supporting plates 15 absorb forces which act on drive shaft 5 and divert these into the foundation in the form of vertical posts 14. The mentioned forces are in particular such forces which arise due to great wind loads and are transferred to drive shaft 5 from gear segments 4. When drive shaft 5 is locked, the stability of entire plant 1 is comparable to the stability of a solar plant mounted on a stationary elevation mounting system. Thus, even great wind loads can act on solar plant 1 without damaging it.

It is to be understood that the elements of solar plant 1 according to the invention as illustrated in the drawings can be realized in different manners. For instance, it is conceivable that the actuation element is made up of two plates, for example disc-shaped plates, which are connected via two fastening pins disposed parallel to each other. The two plates can each be welded to one end of a drive shaft section, for example.

LIST OF REFERENCE NUMERALS 1 solar plant
2a-2c module tables
3 solar modules
4 gear segments
5 drive shaft
6 transmission unit
7 cross brace
8 actuation element
9a, 9b actuation pins
10 connecting sections
11 toothing
12a-12c tooth spaces
13 teeth
vertical post
supporting plates
A transverse axis
L longitudinal axis

The invention claimed is:

1. A solar plant (1) having at least one pivotable module table (2a, 2b, 2c) which supports at least one photovoltaic solar module (3), and is coupled in such a manner to at least one gear element (4) pivotable about an axis (A) that pivoting the gear element (4) causes the module table (2a to 2c) to be pivoted so that the solar modules (3) track the motion of the sun, the gear element (4) being driven and thus pivoted by an electrically driven drive shaft (5), at least one actuation element (8) being integrated in the drive shaft (5), the gear element (4) being both driven and blocked by the actuation element (8), the actuation element (8) engaging into a toothing (11) of the gear element (4) for driving or blocking the gear element (4);

wherein the drive shaft (5) comprises two discontinuous segments each extending along a single first longitudinal axis (L), said two discontinuous segments connected by the actuation element;

wherein the actuation element (8) comprises at least two actuation pins (9a, 9b) located between the two discontinuous segments of the drive shaft, said at least two actuation pins extending along a respective second longitudinal axis, wherein each second longitudinal axis is parallel to but separate from the first longitudinal axis; and wherein the at least two actuation pins are adapted to engage into the toothing (11) of the gear element (4) in order to drive (pivot) or block the gear element (4), the at least two actuation pins (9a, 9b) each resting in circumferentially adjacent tooth spaces (12a, 12b, 12c), of the toothing (11) of the gear element (4) and remaining there for blocking the gear element (4).

2. The solar plant according to claim 1, characterized in that the gear element is a gear segment (4).

3. The solar plant according to claim 1, characterized in that the at least one module table (2a, 2b, 2c) is mounted on the at least one gear element (4).

4. The solar plant according to claim 1, characterized in that the first longitudinal axis (L) of the drive shaft (5), around which it rotates, extends through the toothing (11) of the at least one gear element (4).

5. The solar plant according to claim 1, characterized in that the solar plant comprises vertical posts (14) for elevated mounting of the at least one module table (2a, 2b, 2c), the vertical posts (14) at least partially comprising supporting plates (15) for supporting the drive shaft (5).

* * * * *